US007723872B2

(12) United States Patent
Pilz et al.

(10) Patent No.: US 7,723,872 B2
(45) Date of Patent: May 25, 2010

(54) METHOD AND APPARATUS FOR DETERMINING A SWITCHING TIME FOR AN ELECTRICAL SWITCHING DEVICE

(75) Inventors: Georg Pilz, Poxdorf (DE); Peter Schegner, Dresden (DE); Christian Wallner, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 465 days.

(21) Appl. No.: 11/815,124

(22) PCT Filed: Jan. 17, 2006

(86) PCT No.: PCT/EP2006/050236

§ 371 (c)(1),
(2), (4) Date: Jul. 31, 2007

(87) PCT Pub. No.: WO2006/082131

PCT Pub. Date: Aug. 10, 2006

(65) Prior Publication Data

US 2008/0211317 A1 Sep. 4, 2008

(30) Foreign Application Priority Data

Jan. 31, 2005 (DE) ....................... 10 2005 005 228

(51) Int. Cl.
*H01H 83/00* (2006.01)
*H01H 47/00* (2006.01)
*H02H 3/00* (2006.01)

(52) U.S. Cl. ........................... 307/130; 307/131; 361/3; 361/6

(58) Field of Classification Search ................. 307/130, 307/131; 361/3, 6
See application file for complete search history.

(56) References Cited

U.S. PATENT DOCUMENTS 5,627,415 A * 5/1997 Charpentier et al. ........ 307/116

(Continued)

FOREIGN PATENT DOCUMENTS

EP 1006538 A1 * 6/2000

OTHER PUBLICATIONS

Lobos et al.: "Analysis of Power System Transients Using Wavelets and Prony Method", Power Tech Conference, 2001 IEEE Porto, Sep. 10-13, 2001.

(Continued)

*Primary Examiner*—Jared J Fureman
*Assistant Examiner*—Hal I Kaplan
(74) *Attorney, Agent, or Firm*—Laurence A. Greenberg; Werner H. Stemer; Ralph E. Locher

(57) ABSTRACT

A method and a device for determining a switching time of an electric switching device. An electric switching device includes an interrupter link. A first line section and a second line section can be connected and disconnected by way of the interrupter link. In order to determine a switching time, the temporal progression of a driving voltage is determined in the first line section. In addition, a temporal course of an oscillator voltage appearing in the second line section is determined. Potential switching times are determined at the voltage zero crossings of a resulting voltage. The selection of the potential switching times ensues while evaluating the rises of the driving voltage and of the oscillator voltage or of the polarity of the oscillating current.

22 Claims, 9 Drawing Sheets

U.S. PATENT DOCUMENTS

| | | | | |
|---|---|---|---|---|
| 6,233,132 | B1 | 5/2001 | Jenski | |
| 7,336,461 | B2 * | 2/2008 | Dupraz et al. | 361/71 |
| 7,626,286 | B2 * | 12/2009 | Stanek | 307/130 |
| 2003/0235017 | A1 | 12/2003 | Liu | |
| 2006/0285366 | A1 * | 12/2006 | Radecker et al. | 363/16 |

OTHER PUBLICATIONS

S. Lawrence Marple, Jr.: "Digital Spectral Analysis with Applications", 1987.

Osborne et al.: "A Modified Prony Algorithm For Fitting Functions Defined By Difference Equations", SIAM Journal of Scientific and Statistical Computing, vol. 12, pp. 362-382, Mar. 1991.

* cited by examiner

METHOD AND APPARATUS FOR DETERMINING A SWITCHING TIME FOR AN ELECTRICAL SWITCHING DEVICE

BACKGROUND OF THE INVENTION

Field of the Invention

The invention relates to a method and an apparatus for determining a switching time for an electrical switching device having an interrupter gap which is arranged between a first line section, to which a driving voltage is applied, and a second line section, which forms a resonant circuit after a disconnection process of the switching device.

The paper "Analysis of Power System Transients Using Wavelets and Prony Method", Lobos, T., Rezmer J., Koglin, H.-J., Power Tech Proceedings, 2001 IEEE Porto, 10 to 13 Sep. 2001, states the quality of the voltage in an electrical power transmission system is becoming increasingly important. The waveform of an alternating voltage should ideally be sinusoidal and should oscillate at a predetermined frequency and with a predetermined amplitude. However, transient overvoltages can occur during a switching process, caused by inductive and/or capacitive elements. Transient overvoltages such as these are superimposed on the rated frequency and the rated amplitude of the ideal alternating voltage, and interfere with the desired voltage profile.

Switching operations often represent a triggering event for the occurrence of overvoltages.

SUMMARY OF THE INVENTION

The invention is therefore based on the object of specifying a method and an apparatus for determining a switching time, by means of which the occurrence of transient overvoltages and oscillations in an electrical power transmission system is limited.

In a method of the type mentioned initially, the object is achieved according to the invention in that a time profile of the driving voltage is determined after a disconnection process of the electrical switching device, a time profile of an oscillation voltage which occurs in the resonant circuit after the disconnection process of the electrical switching device is determined, a time profile of a resultant voltage, which corresponds to the difference between the driving voltage and the oscillation voltage, is determined, and at least one rise in the driving voltage and at least one rise in the oscillation voltage are evaluated, and a switching time is defined as a function of the rises and the time profile of the resultant voltage.

Furthermore, according to the invention, the object is also achieved in that a time profile of the driving voltage is determined after a disconnection process of the electrical switching device, a time profile of an oscillation voltage which occurs in the resonant circuit after the disconnection process of the electrical switching device is determined, a time profile of an oscillation current which flows in the resonant circuit after the disconnection process of the electrical switching device is determined, a time profile of a resultant voltage, which corresponds to the difference between the driving voltage and the oscillation voltage, is determined, and at least one rise in the driving voltage and at least one polarity of the oscillation current are evaluated, and a switching time is defined as a function of the at least one rise in the driving voltage and the at least one polarity of the oscillation current, and the time profile of the resultant voltage.

The resultant voltage that occurs may have considerably higher voltage amplitudes than the driving voltage, because of the components contained in the resonant circuit, such as coils and capacitors. This is particularly due to the fact that inductances and capacitances are energy storage elements, which cause time delays. Considerably excessive peak values can therefore occur as a result of poor combinations. These high voltage peaks have disadvantageous effects on the insulation system. The insulation is therefore dielectrically more heavily loaded than in the rated conditions. This results in the insulation aging more quickly. Particularly in the case of solid-insulated line sections such as cables, this can adversely affect the life. In extreme situations, the voltage peaks may be so high that flashovers occur on the lines. These flashovers may be expressed, for example, as partial discharges or arcs on holding insulators for cross-country overhead lines insulated in the open air. However, phenomena such as these are particularly disadvantageous in solid-insulated insulation systems such as cables, since irreparable damage can occur there. The time profile of the resultant voltage is thus a major criterion for defining the switching time of an electrical switching device. In addition, the choice of the switching time can be optimized by taking account of the rises, that is to say the gradient of the rise in the driving voltage as well as the gradient of the rise in the oscillation voltage which is formed in the resonant circuit. In this case, the profile of the resultant voltage is in each case considered at a specific time, and the profile of the oscillation voltage and/or of the driving voltage is evaluated at the same time. A switching time at which the occurrence of overvoltages is limited particularly effectively can be defined as a function of the rises in the driving voltage and/or in the oscillation voltage and the time profile of the resultant voltage. In addition to evaluating the rises in the driving voltage and in the oscillation voltage, it is in principle also possible to use the rise (gradient of the rise) in the driving voltage and the polarity of the oscillation current as selection criteria for defining a switching time in the profile of the resultant voltage. This can be done since the oscillation voltage which drives the oscillation current, and the oscillation current, are coupled to one another, as a function of the impedance in the resonant circuit, by the equations:

$$i = C\frac{du}{dt};\ u = L\frac{di}{dt}.$$

Various methods can be used to determine the time profiles of the driving voltage, of the oscillation voltage and of the resultant voltage and/or the oscillation current. By way of example, it is possible to arrange measurement devices in both the first line section and the second line section, in order to record the time profile of the required parameters. By way of example, voltage transformers and current transformers can be used on the appropriate line sections for this purpose. In order to restrict the number of current transformers and voltage transformers, it is also possible to use only individual transformers, and to in each case calculate the missing current and/or voltage profiles from the transformer data.

In an appropriately equipped system the data can therefore be recorded in real time, the corresponding voltage/current profiles can be determined and a switching time can be defined. The rise in the voltage profiles may, for example, be obtained by differentiation of the time profile at the appropriate time of interest. Electronic data processing devices can be used to determine a first derivative at virtually any desired time within a very short time, and thus to determine the rise in the driving voltage and/or the oscillation voltage. In this case, it is not only possible to provide for the rise to in each case be recorded quantitatively, and therefore to record trends in the profile of the rise from one time interval to the next time interval easily, but it is also possible to provide for the rise to be evaluated exclusively qualitatively, that is to say to determine whether the rise is positive or negative, and whether specific limit values have been overshot or undershot.

It is likewise possible to evaluate the quantity of the polarity of the current, that is to say to determine the magnitude and phase angle of the value of the oscillation current. Furthermore, however, it is also possible to provide just for a statement to be made as to whether the oscillation current that is present has a positive or a negative value at specific times.

One advantageous refinement of the invention can also provide for the switching time to be in the vicinity of a zero crossing of the resultant voltage.

In large-scale systems, an alternating voltage or a plurality of alternating voltages, which are phase-shifted with respect to one another in a common system, is or are often used as the driving voltage. Systems with a plurality of alternating voltages that are related to one another are also referred to as polyphase alternating voltage systems. The driving voltage, which applies voltage to the first line section, is typically at a constant frequency. Roughly speaking, the frequency ranges that are preferably used are 16⅔ Hz, 50 Hz, 60 Hz and other frequency ranges. The heterodyning phenomena that occur in the resonant circuit, triggered by the energy storage elements and time-delaying elements which are included there, mean that the oscillation voltage may be at a different frequency and may have different peak magnitudes than the driving voltage. The lowest overvoltages during a switching process can be assumed to occur in each case in the area of the zero crossing of the resultant voltage. The zero crossings of the resultant voltage are therefore chosen as preferred switching times.

It is advantageously also possible to provide for the vicinity of a zero crossing of the resultant voltage for the switching time to be chosen at which the driving voltage and the oscillation voltage have rises in the same direction sense.

A further advantageous refinement makes it possible to provide for the vicinity of a zero crossing of the resultant voltage for the switching time to be chosen at which the driving voltage has a negative rise and the oscillation current has a positive polarity, or the driving voltage has a positive rise and the oscillation current has a negative polarity.

The resultant voltage has a comparatively large number of voltage zero crossings. In this case, it has been found that some of these voltage zero crossings represent a better switching time than others. One criterion for choice of the most suitable voltage zero crossings of the resultant voltage is represented by the rises in the driving voltages and the rises in the oscillation voltages. If the rises in the driving voltage and in the oscillation voltage have the same direction sense at a zero crossing of the resultant voltage, then this zero crossing is particularly suitable for use as a switching time. In this case, the expression the same rises means that the driving voltage and the oscillation voltage each have a positive rise, or each have a negative rise. Furthermore, the numerical magnitude of the rise can also be included in the evaluation process, thus making it possible to define the switching time more accurately.

Since the oscillation voltage and the oscillation current that is driven by the oscillation voltage are related to one another in the resonant circuit and can be converted to one another by calculation, it is also possible to evaluate the polarity of the oscillation current rather than to evaluate the rises in the oscillation voltage. One particularly suitable switching time is a zero crossing of the resultant voltage at which the driving voltage has a negative rise and the oscillation current has a positive polarity, or at which the driving voltage has a positive rise and the oscillation current has a negative polarity. When a change occurs in the evaluation of the oscillation voltages to the oscillation current a change should be made to evaluation of the polarity, since the inductances and/or capacitances contained in the resonant circuit result in a shift through about 90 degrees between the current profile and the voltage profile within an alternating voltage system.

A further advantageous refinement makes it possible for the oscillation current to flow through a compensation inductance.

By way of example, overhead lines are used in electrical power transmission systems. A capacitor arrangement is formed between the overhead line that is carrying high voltage and the ground potential underneath the overhead line. In consequence, the overhead line can act as a capacitor, and appropriate charging power must be introduced into the overhead line. In order to limit this charging power, it is possible to arrange so-called compensation inductors along the overhead line. These compensation inductors are coils which have an appropriate inductance, and compensate for the capacitive load produced by the overhead line. These inductors may be designed differently so that, for example, they can be grounded as required, or else their inductance can be varied. Switchable inductors are preferably used at the start and at the end of an overhead line. Alternatively, such constellations can also occur in underground cable systems in which a corresponding capacitive impedance is formed between the electrical conductor and the cable sheath. The compensation inductor also governs the magnitude of the oscillation current in the second line section. The components which are actually present and the resistance resulting from the conductor material that is used result in impedance losses, remagnetization losses, etc. so that the oscillation current and the oscillation voltage are damped in the second line section.

A further advantageous refinement variant makes it possible to provide for the time profile of the oscillation voltage and/or of the oscillation current to be determined by means of a Prony method.

The interrupter gap is closed when the switching device is connected. The first line section with the driving voltage drives a current into the second line section. By way of example, the driving voltage is produced by means of a generator in a power station. The driving voltage that is applied results in this voltage propagating in the second line section as well. Loads are typically connected in the second line section. By way of example, these may be motors, heaters or else complete system sections, such as industrial consumers or a large number of households. After a disconnection process, the driving voltage is now still present only in the first line section, since the interrupter gap has been opened and the driving voltage can no longer propagate in the second line section. The first line section typically contains power-generating devices such as driving supply systems with corresponding generators and/or power stations. An oscillation voltage is produced in the second system section, corresponding to its constellation with resistive, inductive and/or capacitive components, resulting from the sudden disconnection of the interrupter gap and the rates of change associated with this, and this oscillation voltage drives an oscillation current. The time profile of the driving voltage is in this case determined relatively easily, since it can be assumed that this is a rigid system in which the driving voltage is the governing variable and remains approximately constant. It is more problematic to determine the profile of the oscillation current and/or oscillation voltage in the resonant circuit. In order to have an appropriate time profile, it is desirable to make a reliable prediction of the profile for one or more future intervals from measured values determined within a short interval. By way of example, a Prony method can be used for this purpose.

The Prony method offers the advantage over other methods, for example Laplace transformation, of allowing a comparatively accurate prediction of further voltage and/or current profiles to be made from a small number of measured values.

The Prony method is suitable for carrying out controlled switching in a particular manner since, in comparison to a Fourier transformation, the sampling time period for the available voltage and/or current data is independent of the fundamental frequency to be expected. Furthermore, when using the Prony method, the phase shift and the damping of the individual frequency components can be recorded as required. In order to use the Prony method, the available voltage and/or current data must first of all be determined in the electrical system at different times. This is based on N complex data points x[1], . . . x[N] of any desired sinusoidal or exponentially damped event. These data points must be equidistant data points. This sampled process can be described by a summation of p exponential functions:

$$y[n] = \sum_{k=1}^{p} A_k \exp[(\alpha_k + j2\pi f_k)(n-1)T + j\theta_k], \tag{2.1}$$

where

T—sampling period in s $A_k$—amplitude of the complex exponent $a_k$—damping factor in $s^{-1}$ $f_k$—frequency of the sinusoidal oscillation in Hz $\theta_k$—phase shift in radians.

In the case of an actually sampled profile, the complex exponents are broken down into complex-conjugate pairs with the same amplitude. This reduces Equation (2.1)

$$y[n] = \sum_{k=1}^{p/2} 2A_k \exp[\alpha_k (n-1)T]\cos[2\pi f_k (n-1)T + \theta_k] \tag{2.2}$$

for $1 \leqq n \leqq N$. If there is an even number of exponential functions p, then p/2 damped cosine functions exist.

If the number is odd, then (p−1)/2 damped cosine functions exist, and a very slightly damped exponential function.

A simpler representation of Equation (2.1) is obtained by combination of the parameters into time-dependent and time-independent parameters.

$$y[n] = \sum_{k=1}^{p} h_k z_k^{n-1} \tag{2.3}$$

$$h_k = A_k \exp(j\theta_k) \tag{2.4}$$

$$z_k = \exp[(\alpha_k + j2\pi f_k)T] \tag{2.5}$$

The parameter $h_k$ is the complex amplitude and represents a time-independent constant. The complex exponent $z_k$ is a time-dependent parameter.

In order to allow an actual process to be modeled with the aid of a summation, it is necessary to minimize the mean square error ρ over N sampled data points.

$$\rho = \sum_{n=1}^{N} |\varepsilon[n]|^2 \tag{2.6}$$

$$\varepsilon[n] = x[n] - y[n] = x[n] - \sum_{k=1}^{p} h_k z_k^{n-1} \tag{2.7}$$

This minimizing process is carried out taking account of the parameters $h_k$, $z_k$ and p. This leads to a difficult non-linear problem, even if the number p of exponential functions is known [see Marple, Lawrence: Digital Spectral Analysis. London: Prentice-Hall International, 1987]. One possible way would be to use an iterative solution method (Newton method). However, this would be dependent on large computation capacities because matrices would often need to be inverted which are generally larger than the number of data points. The Prony method, which uses linear equations for solution, offers an efficient solution to this problem. In this method, the non-linear aspect of the exponential functions is taken into account by means of polynomial factorization. Fast solution algorithms exist for this type of factorization.

The Prony Method

For approximation of a profile, it is necessary to record a sufficient number of data points in order to define the parameters ambiguously. This means that at least x[1], . . . x[2p] complex data points are in each case required.

$$x[n] = \sum_{k=1}^{p} h_k z_k^{n-1}. \tag{2.8}$$

It should be noted that x[n] has been used instead of y[n]. This is done because exactly 2p complex data points are required, which correspond to the exponential model with the 2p complex parameters $h_k$ and $z_k$. This relationship is expressed in Equation (2.6) by minimizing the square error.

The aim of the Prony algorithm has been shown in Equation (2.8). A more comprehensive representation of the equation for $1 \leqq n \leqq p$ is given in Equation (2.9).

$$\begin{pmatrix} z_1^0 & z_2^0 & \cdots & z_p^0 \\ z_1^1 & z_2^1 & \cdots & z_p^1 \\ \vdots & \vdots & \ddots & \vdots \\ z_1^{p-1} & z_2^{p-1} & \cdots & z_p^{p-1} \end{pmatrix} \begin{pmatrix} h_1 \\ h_2 \\ \vdots \\ h_p \end{pmatrix} = \begin{pmatrix} x[1] \\ x[2] \\ \vdots \\ x[p] \end{pmatrix} \tag{2.9}$$

If the elements z within the matrix are known, this results in a number of linear equations which can be used to calculate the complex amplitude vector h.

As one approach for the solution process, it is assumed that Equation (2.8) is the solution of a homogeneous linear differential equation with constant coefficients. In order to find the appropriate equation for the solution, a polynomial φ(z) of degree p is first of all defined.

$$\phi_p(z) = a[0]z^p + a[1]z^{p-1} + \ldots + a[p-1]z + a[p] \tag{2.10}$$

The parameter z to be determined indicates the zeros of the polynomial.

The polynomial is represented as a summation with the aid of the fundamental algebra rule (Equation 2.11). The coefficient a(m) is complex, and the definition a[0]=1 is used.

$$\phi_p(z) = \sum_{m=0}^{p} a[m] z^{p-m} \tag{2.11}$$

If the indices in Equation (2.8) are shifted from n to n−m, and this is multiplied by the parameter a(m), this results in:

$$a[m]x[n-m] = a[m]\sum_{k=1}^{p} h_k z_k^{n-m-1} \tag{2.12}$$

If simple products (a[0]x[n], . . . , a[m−1]x[n−m+1]) are formed, and these are added, the following expressions are obtained from Equation (2.12)

$$a[0]x[n] = a[0]\sum_{k=1}^{p} h_k z_k^{n-1} \tag{2.13}$$

$$a[1]x[n-1] = a[1]\sum_{k=1}^{p} h_k z_k^{n-2}$$

$$a[2]x[n-2] = a[2]\sum_{k=1}^{p} h_k z_k^{n-3}$$

$$\vdots$$

$$a[m]x[n-m] = a[m]\sum_{k=1}^{p} h_k z_k^{n-m-1}$$

$$\sum_{m=0}^{p} a[m]x[n-m] = \sum_{m=0}^{p}\left[a[m]\sum_{k=1}^{p} h_k z_k^{n-m-1}\right]$$

Reorganization of the right-hand side of Equation (2.13) results in:

$$\sum_{m=0}^{p} a[m]x[n-m] = \sum_{k=1}^{p}\left[h_k \sum_{m=0}^{p} a[m] z_k^{p-m-1}\right]. \tag{2.14}$$

Substitution of $z_i^{n-m-1} = z_i^{n-p} z_i^{n-m-1}$ results in:

$$\sum_{m=0}^{p} a[m]x[n-m] = \sum_{k=1}^{p}\left[h_k z_k^{n-p} \sum_{m=0}^{p} a[m] z_k^{p-m-1}\right] = 0. \tag{2.15}$$

The polynomial from Equation (2.11) can be seen again in the right-hand part of the summation. The zeros that are sought are obtained by determining all the roots $z_k$. Equation (2.15) is the sought linear differential equation, whose solution is Equation (2.8). The polynomial (2.11) is the characteristic equation for the differential equation.

The p equations represent the permissible values for a[m] which solve Equation (2.15).

$$\begin{pmatrix} x[p] & x[p-1] & x[p-2] & \dots & x[0] \\ x[p+1] & x[p] & x(p-1) & \dots & x[1] \\ x[p+2] & x[p+1] & x[p] & \dots & x[2] \\ \vdots & \vdots & & \ddots & \vdots \\ x[2p-1] & x[2p-1] & x[2p-3] & \dots & x[p] \end{pmatrix} \begin{pmatrix} a[0] \\ a[1] \\ a[2] \\ \vdots \\ a[p] \end{pmatrix} = 0 \tag{2.16}$$

There are p unknowns in Equation (2.16). The matrix x comprises p+1 rows and columns. Equation (2.16) is therefore overdefined. In order to obtain a solution vector, the upper row in the matrix x, and therefore also the known coefficient a[0], is deleted, and the first column is subtracted.

$$\begin{pmatrix} x[p] & x[p-1] & \dots & x[1] \\ x[p+1] & x[p] & \dots & x[2] \\ \vdots & \vdots & \ddots & \vdots \\ x[2p-1] & x[2p-2] & \dots & x[p] \end{pmatrix} \begin{pmatrix} a[1] \\ a[2] \\ \vdots \\ a[p] \end{pmatrix} = - \begin{pmatrix} x[p+1] \\ x[p+2] \\ \vdots \\ x[2p] \end{pmatrix} \tag{2.17}$$

The p unknowns can be determined by using the p equations. The Prony method can thus be combined in three steps. Solution of Equation (2.17)⇒results in the coefficients of the polynomial (2.11)

Calculation of the roots of the polynomial Equation (2.11)⇒ results in the time-dependent parameter $z_k$ from Equation (2.8)⇒calculation and the damping and frequency from z $$a_k = \ln|z_k|/T \tag{2.18}$$

$$f_k = \tan^{-1}[Im(z_k)/Re(z_k)]/[2\pi T] \tag{2.19}$$

Use of Equation (2.9)⇒solution for h⇒calculation of the amplitude and of the phase shift $$A_k = |h_k| \tag{2.20}$$

$$\theta_k = \tan^{-1}[Im(h_k)/Re(h_k)] \tag{2.21}$$

There is no need to determine the individual parameters in order to estimate the future time profile. The further profile of the input signal can also be "predicted" using the parameters $z_k$ and $h_k$, Equation (2.8) and a change in the variable n, which reflects the time period to be estimated. If there is a difference in the time step width for the estimation in comparison to that for sampling, the parameters damping, frequency, amplitude and phase shift must, however, be determined explicitly.

A further advantage of the Prony method for analysis of current and/or voltage profiles is that it can also be used for high-frequency processes. The expression high-frequency processes should be understood to mean processes which oscillate in the range from 100 to 700 Hz. The operating frequency range covers the frequencies between 24 and 100 Hz. Frequencies below 24 Hz should be understood as being low frequencies. High-frequency processes occur, for example, when switching devices are switched. The high-frequency components are superimposed on the fundamental frequency.

Furthermore, it is advantageously possible to use a modified Prony method for processing the determined voltage and/or current data.

The modified Prony method is similar to the maximum likelihood principle (Gaussian principle of least squares). The calculation is based on a fixed p (number of exponential functions, see above). An iteration process is carried out during the calculation, thus optimizing the accuracy of the voltage and/or current profiles to be predicted. The degree of accuracy of the prediction can be varied by defining tolerance limits for the optimization process. The computation time required can thus be reduced depending on the requirement. The modified Prony method is described in detail in Osborne, Smyth: A modified Prony Algorithm for fitting functions defined by difference equations, SIAM Journal of Scientific and Statistical Computing, volume 12, 362-382, March 1991. The modified Prony method is insensitive to "noise" in the voltage and/or current data determined from the electrical power supply system. "Noise" such as this is unavoidable when using actual components for determining the voltage and/or current data. Interference such as this can be minimized only with an unreasonably large amount of effort. The robustness to "noise" in the input signals means that the modified Prony method allows the use of low-cost test equipment for determining the available voltage and/or current data in the electrical system.

An apparatus can be provided for carrying out the method as described above, which has means for automated processing of the voltage and/or current data, using the Prony methods.

Since the processes under consideration take place within intervals of just a milliseconds, it has been found to be advantageous to use an apparatus with means for automated processing of the voltage and/or current data. In order to carry out this automated processing particularly quickly, it is possible for the means for automated processing to be hard-wired programmed. Circuits such as these are known as application-specific integrated circuits "ASIC". However, if sufficiently fast means are available for automated processing, then the means may be in programmable logic form. Programmable logic means such as these for automated processing can easily be matched to changing constraints, by reprogramming.

A further advantageous refinement makes it possible to provide for the voltage across the interrupter gap after a disconnection process to correspond to the resultant voltage.

During a connection or disconnection process, the interrupter gap must produce an impedance change as quickly as possible from an ideally infinitely large impedance to an infinitely low impedance, or vice versa. Ideally, this should take place suddenly. However, this is not the case in present technical systems. Switching elements with contact pieces which can move relative to one another and are located in an insulating gas are used in the high-voltage field. This insulating gas is preferably sulfur hexafluoride at an increased pressure. By way of example, during a connection process, pre-arcing occurs even before any conductive contact between the contact pieces which can move relative to one another. During a disconnection process, after quenching of a disconnection arc which may occur after the physical separation of the contact pieces which can move relative to one another, a certain recovery time is required in which contaminated arc quenching gas formed in the switching gap is removed from the switching gap and replaced by uncontaminated insulating gas.

The resultant voltage which is formed across the interrupter gap results from the driving voltage applied to one side of the interrupter gap and the oscillation voltage applied to the other side of the interrupter gap. Since, as has been stated above, time delays occur when oscillation processes occur in the resonant circuit, considerably higher voltage magnitudes can occur across the interrupter gap than the rated voltage of the driving voltage would lead one to suppose. The resultant voltage which occurs across the interrupter gap of the electrical switching device therefore represents a significant variable, which is used to define a switching time for an electrical switching device. The electrical switching device also has to reliably cope with an excessive voltage.

In this case, it is also advantageously possible to provide for the pre-arcing characteristic of the switching device to be taken into account when determining the switching time.

In addition to definition of an advantageous switching time, it should be noted that actual switching devices have a pre-arcing characteristic. Before two contact pieces which can be moved relative to one another touch, the arc will have already been struck in the insulated medium located between the contact pieces. The way in which a circuit breaker has a tendency to pre-arcing is dependent on the design and on the profile of the switching movement. Ideally, this pre-arcing should not occur, that is to say mechanical contact is made between the contact pieces, with the circuit being closed, in each case at the specifically actuated contact-making time. However, this ideal pre-condition cannot be achieved in practice, with the result that a switching device has a so-called pre-arcing characteristic. This characteristic has a certain gradient, and there may possibly be an intersection between the characteristic and the voltage profile. Pre-arcing occurs at this time even when the contact pieces have not yet made a conductive contact.

A further advantageous refinement can provide that the switching time is defined in the vicinity of any desired zero crossing of the resultant voltage in the event of progressive damping of the oscillation voltage and/or of the oscillation current.

The oscillation voltage and/or the oscillation current in the resonant circuit are damped by the actual components contained in the resonant circuit, such as capacitors, coils and resistors. If the damping is sufficiently heavy, it is no longer sensibly possible to carry out any measurement, so that it is possible to dispense with the evaluation of the rises in the oscillation voltage and/or in the driving voltage and/or in the polarity of the oscillation current. In order to allow rapid switching, this is then just based on the zero crossings of the resultant voltage, with switching taking place at the next-possible zero crossing of the resultant voltage. If the damping of the oscillation voltage or of the oscillation current is progressive, the effects of an excessive voltage across the interrupter gap of the electrical switching device are negligible.

Furthermore, it is advantageously possible to provide for the switching time to be used for a connection process for the electrical switching device.

Electrical power transmission systems use so-called protective devices which automatically initiate a disconnection process for an electrical switching device when a fault occurs. These disconnection processes are often triggered by sporadically occurring faults. Some sporadically occurring faults allow quick reconnection. By way of example, one typical sporadic fault occurs in the area of overhead lines. An object, for example a branch of a tree, causes a short circuit on the line. The event causing the short circuit lasts, however, only for a short time, so that once the fault has decayed (air insulation is once again produced between the lines and the branch, and the short-circuit event is over), the line can be reconnected. Connections such as these are also known as automatic reconnections. These automatic reconnections are completed within time intervals of 300 to about 500 ms, that is to say automatic reconnection of the switching device is initiated within a maximum time of 300 (500) ms after disconnection of the electrical switching device has been completed. Owing to the relatively short interval, high oscillation voltages and oscillation currents can be formed within the resonant circuit that is formed in the process. Particularly for automatic reconnection and/or for connection of a switching device shortly after disconnection, it is important to determine a suitable switching time in order to prevent flashovers resulting from excessive voltages across the interrupter gap in the electrical switching device. Resistors which limit overvoltages are no longer necessary for the electrical switching device or may be made smaller.

Furthermore, the invention also relates to an apparatus for carrying out the method mentioned initially.

The object of the invention in this case is to specify an apparatus which allows selection of a switching time.

According to the invention, in the case of an apparatus for carrying out a method as claimed in patent claims 1 to 11, this is achieved in that the apparatus has a device for comparing the rise in the driving voltage and the oscillation voltage, and/or the polarity of the oscillation current.

A device for comparing the rise in the driving voltage and the oscillation voltage and/or the polarity of the oscillation current allows simple selection of the potential switching times with respect to the voltage zero crossings of the resultant voltage. The result of a comparison such as this may, for example, be a yes or no decision on the permissibility of a switching process.

Exemplary embodiments of the invention will be described in more detail in the following text and are illustrated schematically in the figures, in which:

DESCRIPTION OF THE INVENTION

Figure 1:
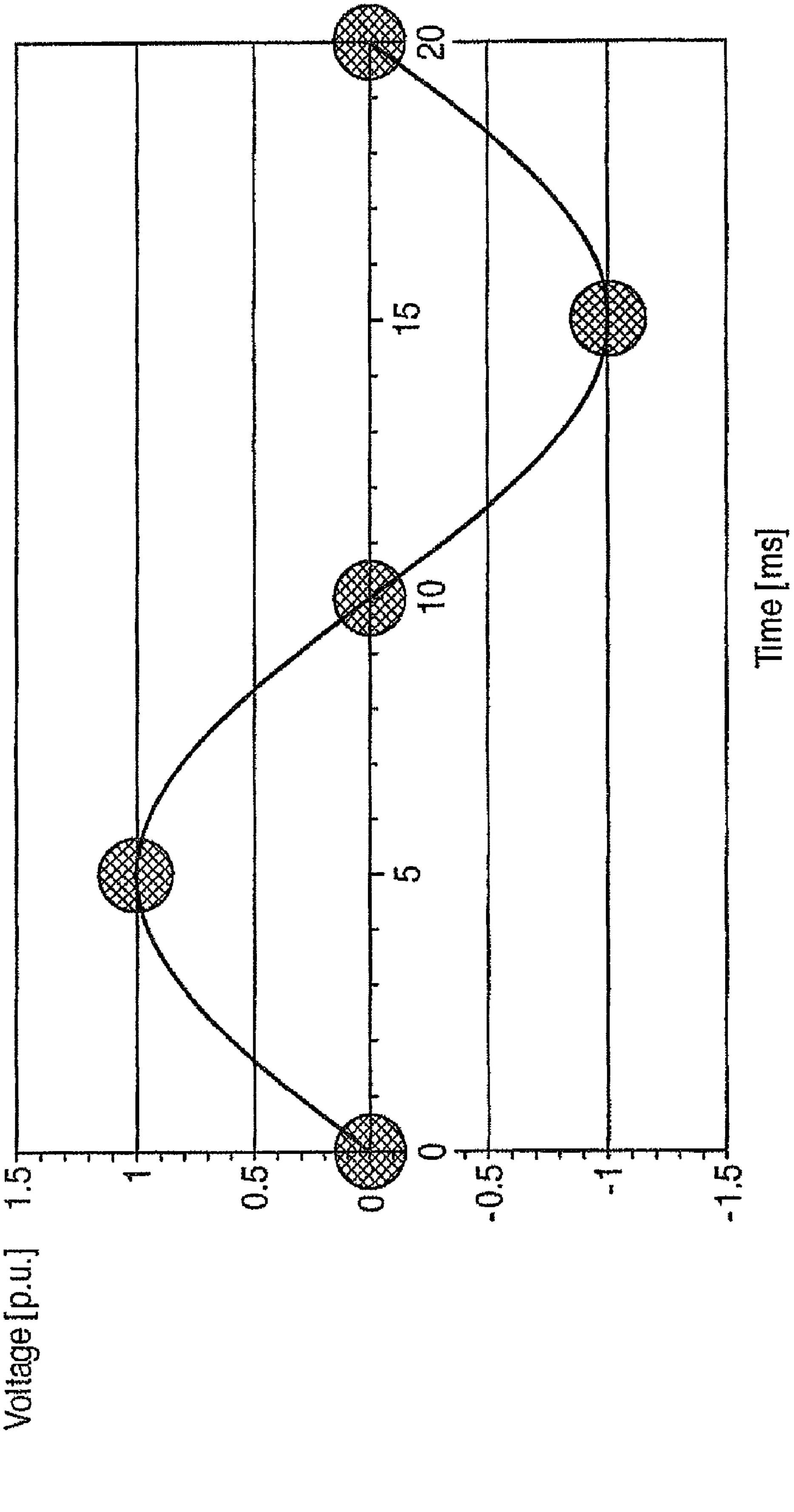
FIG. 1 shows an outline illustration of a voltage profile with optimum switching times.

By way of example, FIG. 1 shows a sinusoidal profile of an alternating voltage whose frequency is 50 Hz. In order to avoid overvoltages from being produced, inductive loads should in each case be switched as far as possible at the voltage maximum of a sinusoidal voltage profile (times 5 ms, 15 ms). In contrast, capacitive loads should in each case be switched during a voltage zero crossing, in order to avoid charging processes on a capacitor (times 0 ms, 10 ms, 20 ms).

Ideal occurrence of sinusoidal voltage profiles can now be observed only in exceptional cases in an actual electrical power transmission system.

Figure 2:
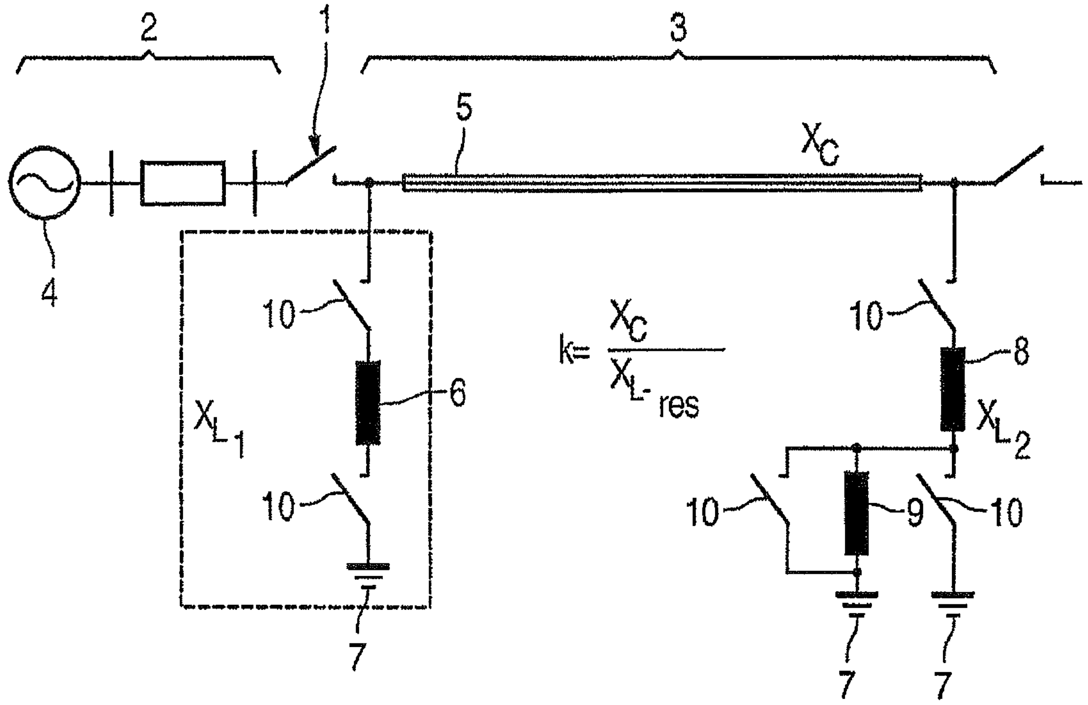
FIG. 2 shows a schematic design of an electrical power transmission system.

FIG. 2 shows a fundamental design of a line section within an electrical power transmission system. An electrical switching device has an interrupter gap 1. By way of example, the interrupter gap is formed from two contact pieces which can move relative to one another. A first line section 2 and a second line section 3 can be connected to one another and disconnected from one another via the interrupter gap 1. The first line section 2 has a generator 4. The generator 4 produces a driving voltage which, for example, is a 50 Hz alternating voltage in a polyphase voltage system. The second line section 3 has an overhead line 5. The overhead line 5 can be connected at its first end by means of a first inductor 6 to ground potential 7, and at its second end via a second inductor 8 to ground potential 7. In addition, it is also possible to provide for a further inductor 9 to be connected to the second inductor 8. Different variants of the inductors 6, 8, 9 can be connected to ground potential 7 by means of different switching devices 10. It is therefore possible to compensate the overhead line 5 to different extents, depending on the load situation. For example, the capacitive impedance $$X_c\left(X_c = \frac{1}{\omega \cdot c}\right)$$

of the overhead line can be overcompensated or else undercompensated for by the inductive impedance $X_L(X_L=j\cdot\omega\cdot L)$ of the inductors. A compensation degree k can be determined from the ratio of the capacitive impedance $X_c$ of the overhead line and the inductive impedance $X_{Lres}$ of all the inductors. The inductors 6, 8, 9 can be connected differently with respect to one another in order to set the compensation degree k. However, it is also possible to provide for the inductors to have a variable inductive impedance $X_L$. By way of example, plunger-type core inductors may be used for this purpose.

Once the interrupter gap 1 has been opened, a resonant circuit can be formed via ground potential 7 in the second line section 3. In order to form a resonant circuit, corresponding current paths must be formed via the switching devices 10 to ground potential 7 in the second line section 3. A resonant circuit is formed from the inductive and capacitive impedances, and an oscillation current can flow in the resonant circuit, driven by an oscillation voltage.

Figure 3:
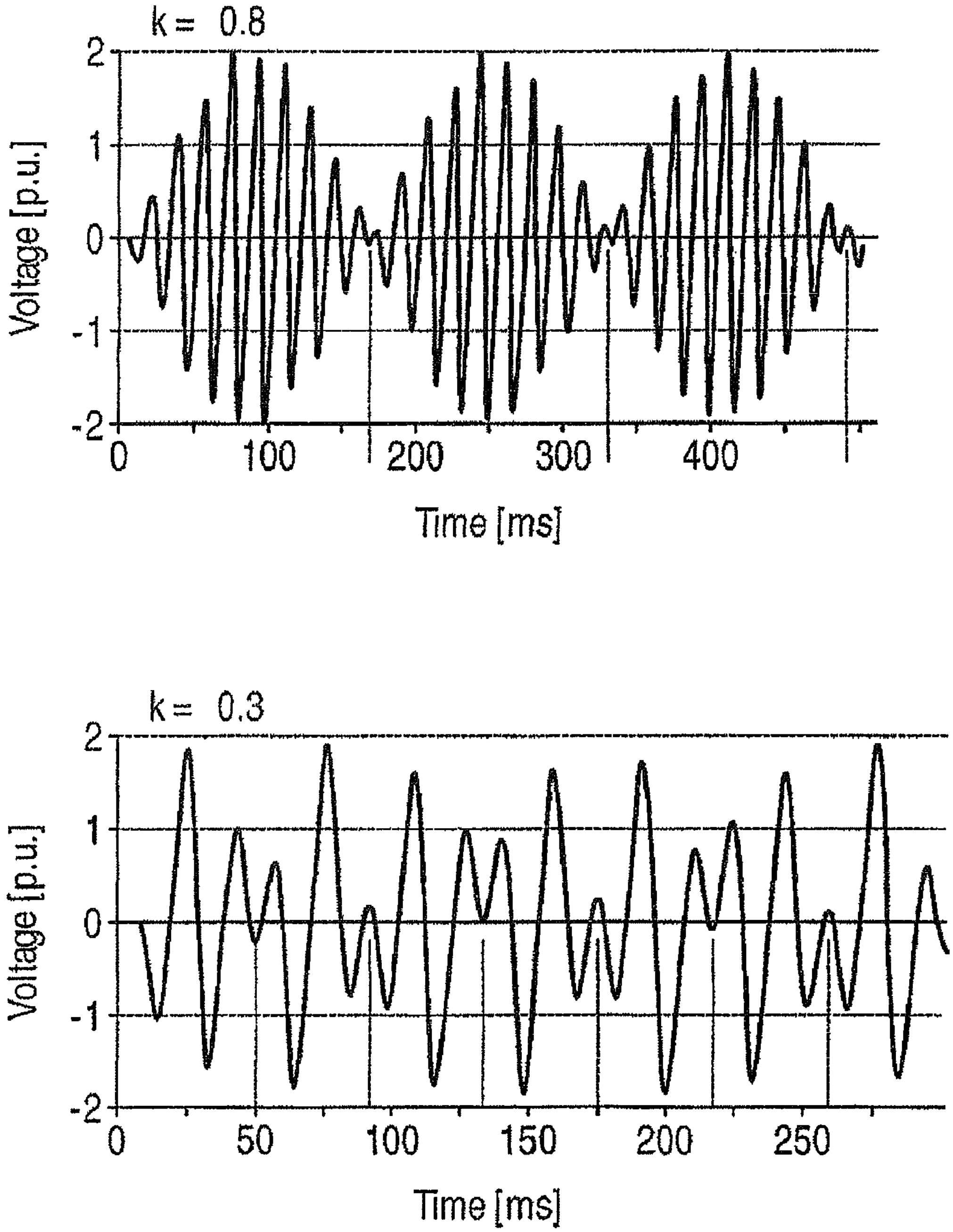
FIG. 3 shows the profiles of two different resultant voltages.

By way of example, FIG. 3 shows the resultant voltage profiles formed across the interrupter gap 1 for different compensation degrees. A compensation degree of k=0.8 results in a specific frequency profile, which has a multiplicity of voltage zero crossings. This frequency profile has a beat frequency. A compensation degree of 0.3 results in a correspondingly different frequency profile, although this once again has a multiplicity of voltage zero crossings.

When the method according to the invention is used, it is possible to reduce or even completely dispense with the connection resistors which were previously provided in order to limit overvoltages. Better switching results can thus be achieved by the definition of an optimum reconnection time, that is to say reduced transient overvoltages occur than when the connection of an electrical switching device with connection resistors is controlled arbitrarily.

Figure 4:
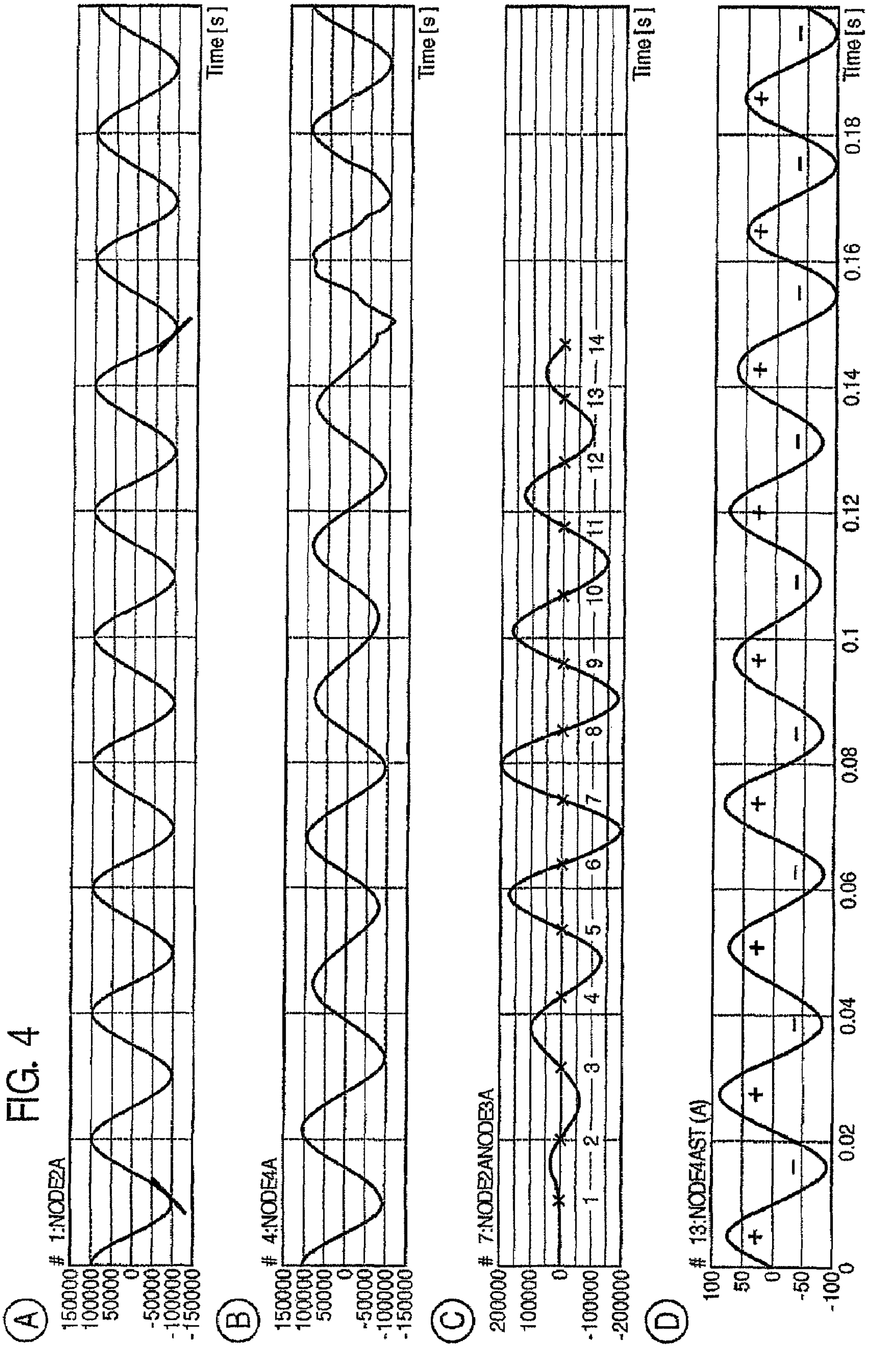
FIG. 4 shows a profile of different voltages and currents.

FIG. 4 shows the evaluation and determination of a switching time for an electrical switching device using the driving voltage A, the oscillation voltage B, the resultant voltage C and the oscillation current D. The driving voltage A oscillates at a constant frequency and with a constant amplitude. The oscillation voltage B which occurs on the second line section 3 in the resonant circuit oscillates at a specific frequency, which is variable, and with variable amplitudes. This variability is the result of the fact that damping occurs in the system and additional external influences can be superimposed. The superimposition of the driving voltage A on the first line section 2 and the oscillation voltage B which occurs in the second line section 3 results in a time profile of a resultant voltage C. The resultant voltage C corresponds to the voltage across the open interrupter gap. As can clearly be seen in FIG.

4, the resultant voltage C oscillates with a considerably variable amplitude, and there is a phase shift both with respect to the driving voltage A and with respect to the oscillation voltage B. Potential switching times occur at the voltage zero crossings of the resultant voltage C. The voltage zero crossings are marked with crosses in order that they can be seen more easily in the profile of the resultant voltage C. However, the voltage zero crossings of the resultant voltage C are not all suitable for a reconnection process for the interrupter gap 1. The polarity of the oscillation current D is also used as a selection criterion in the examples illustrated in FIG. 4. In order to allow this to be seen better, the polarity of the oscillation current D is in each case marked with a plus or a minus in the corresponding intervals between the current zero crossings of the oscillation current D. A positive polarity of the oscillation current D occurs at the first voltage zero crossing of the resultant voltage D, together with a positive rise in the driving voltage A, that is to say the first voltage zero crossing 1 of the resultant voltage C is not suitable for a connection process. A negative rise in the driving voltage A occurs at the fourteenth voltage zero crossing of the resultant voltage C, and the oscillation current D has a positive polarity, that is to say, of the voltage zero crossings, the fourteenth voltage zero crossing of the resultant voltage C is particularly suitable for a reconnection process. The first and the fourteenth voltage zero crossings are in this case used only by way of example. Furthermore, other voltage zero crossings may also be particularly suitable for a connection process for the interrupter gap 1. These may be located within the interval illustrated in FIG. 4, or else outside this interval.

Figure 5:
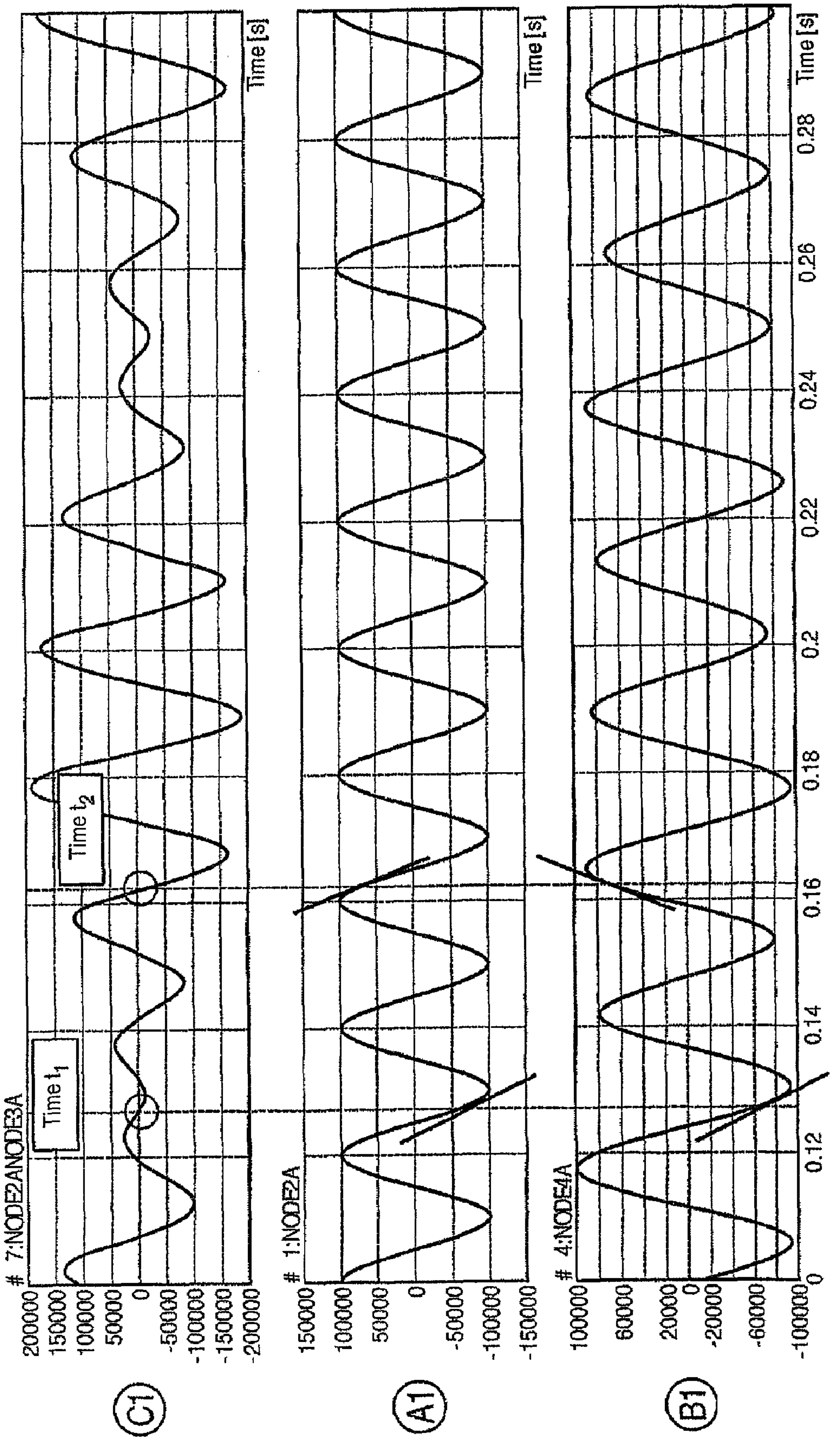
FIG. 5 shows a profile of different voltages.

FIG. 5 shows an alternative selection method, in which A1 illustrates the time profile of the driving voltage, B1 the time profile of the oscillation voltage, and C1 the resultant voltage across the interrupter unit. The resultant voltage C1 results from the potential difference between the driving voltage A1 applied to the first line section 2 and the oscillation voltage B1 on the second line section side 3 of the interrupter gap 1. The zero crossings of the resultant voltage C1 once again represent potential switching times. The rises (gradients of the rise) at these times are in each case evaluated in order to choose the most suitable voltage zero crossings of the resultant voltage C1. At the time t1, both the driving voltage A1 and the oscillation voltage B1 have a negative rise, that is to say this time is particularly suitable for a reconnection process. At the time t2, the driving voltage A1 has a negative rise and the oscillation voltage C1 has a positive rise, that is to say the time t2 and the zero crossing of the resultant voltage C1 that occurs at this time are not suitable for a reconnection process. Furthermore, every other zero crossing of the resultant voltage can be classified on the basis in the respectively associated rises in the driving voltage and oscillation voltage, thus resulting in even more suitable and unsuitable zero crossings of the resultant voltage for a reconnection process.

Figure 6:
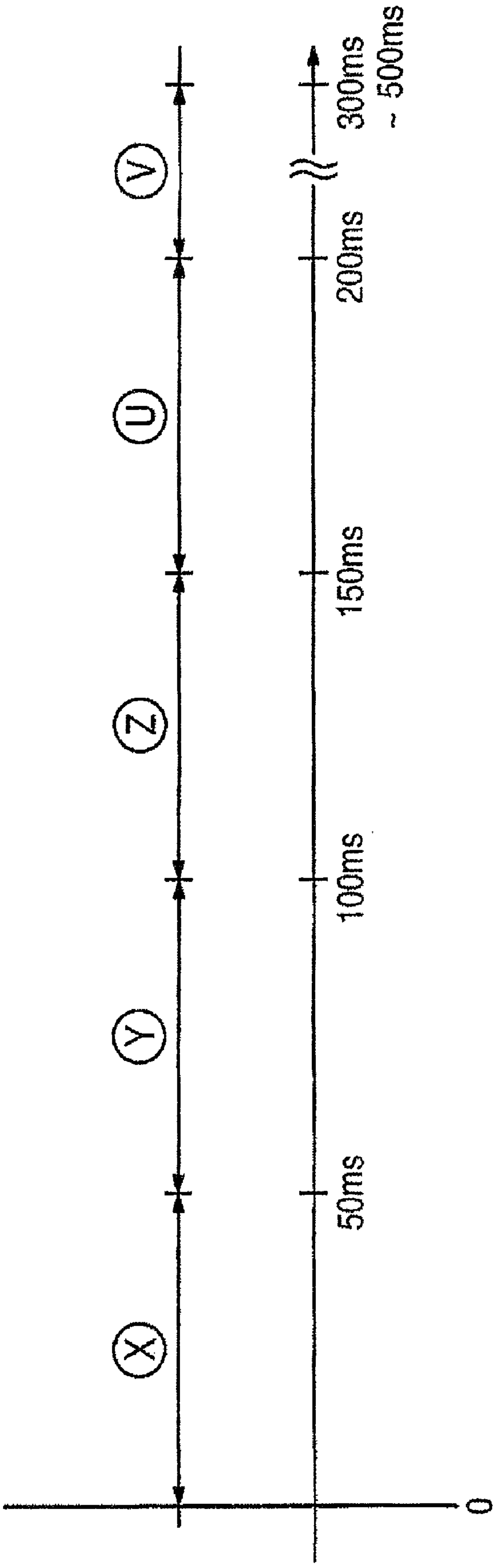
FIG. 6 shows the timing for determining a future voltage/current profile.

FIG. 6 shows a time sequence for sampling X, calculation Y, monitoring Z, renewed calculation U and the time interval for tripping V. For example, in order to allow automatic reconnection to be carried out within 300 to about 500 ms, the voltage profile of the resultant voltage can be determined in advance. In this case, it is assumed that the interrupter gap in the electrical switching device is opened at a time t=0 ms. Within the first 50 ms, the profile of the driving voltage, of the oscillation voltage and/or of the oscillation current that occur are sampled or determined, and the resultant voltage is determined with the knowledge of the voltage profile of the driving voltage. Within the time interval from 50 to 100 ms, the future profile of the oscillation voltage and/or of the oscillation current is calculated, resulting in a future profile of the resultant voltage profile. Within the time interval from 100 to 150 ms, it is possible to compare the values determined by calculation for the oscillation voltage, oscillation current and resultant voltage, driving voltage, in terms of their time profile, with the values which have actually already occurred. If the values determined by calculation are confirmed within the time window provided for monitoring, it is assumed that the signal profiles have been calculated correctly in advance. By way of example, a Prony method or similar methods can be used for calculation. If it is found that the prior calculation of the time profiles is incorrect, a time interval from 150 to 200 ms is now still available in which the future voltage and/or current profiles can be recalculated with the assistance of the voltage and/or current profiles determined in the actual network within the time interval from 0 to 150 ms. A more accurate calculation of the future time profile of the currents and/or of the voltages can be obtained on the basis of the greater time interval from 0 to 150 ms and the greater number of available measured values. An ideal switching time can now be defined as a function of the voltage zero crossings of the resultant voltage as well as the rises in the oscillation voltage and in the driving voltage, and/or in the driving voltage and the polarity of the oscillation current that occurs. A time profile for emitting a tripping signal can now be produced as a function of the switching time, in which case it is possible to take account of the pre-arcing characteristic of the interrupter gap 1 being used, so that reconnection of the interrupter unit takes place at the latest after 300 or 500 ms, at a time at which any excessive voltages within the electrical power transmission system are limited. Reconnection can be carried out particularly quickly if the time profiles illustrated by way of example in FIGS. 4 and 5 are calculated in advance within a very short interval (50 ms or less). This advance determination allows an adequate lead time in which all of the necessary waiting times or lead times can be included. By way of example, it is possible to plan in the time which is required from the production of a tripping signal to the arrival of the signal at the tripping device for the electrical switching device, with its interrupter gap 1. Furthermore, it is also possible to take account of the pre-arcing characteristic of the interrupter gap 1. This allows even more accurate synchronous switching.

Figure 7:
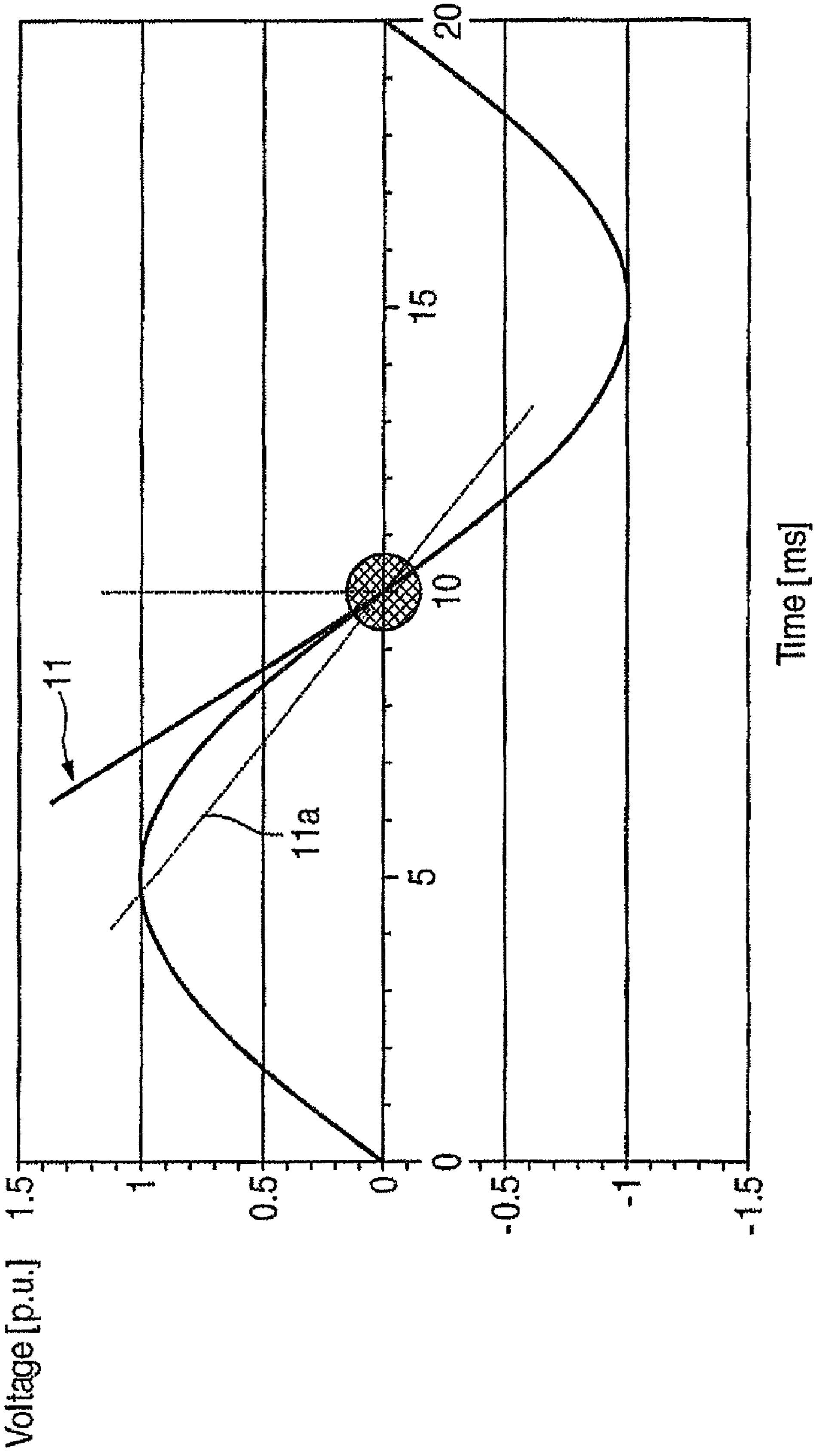
FIG. 7 shows how a pre-arcing characteristic is taken into account for a capacitive load.
Figure 8:
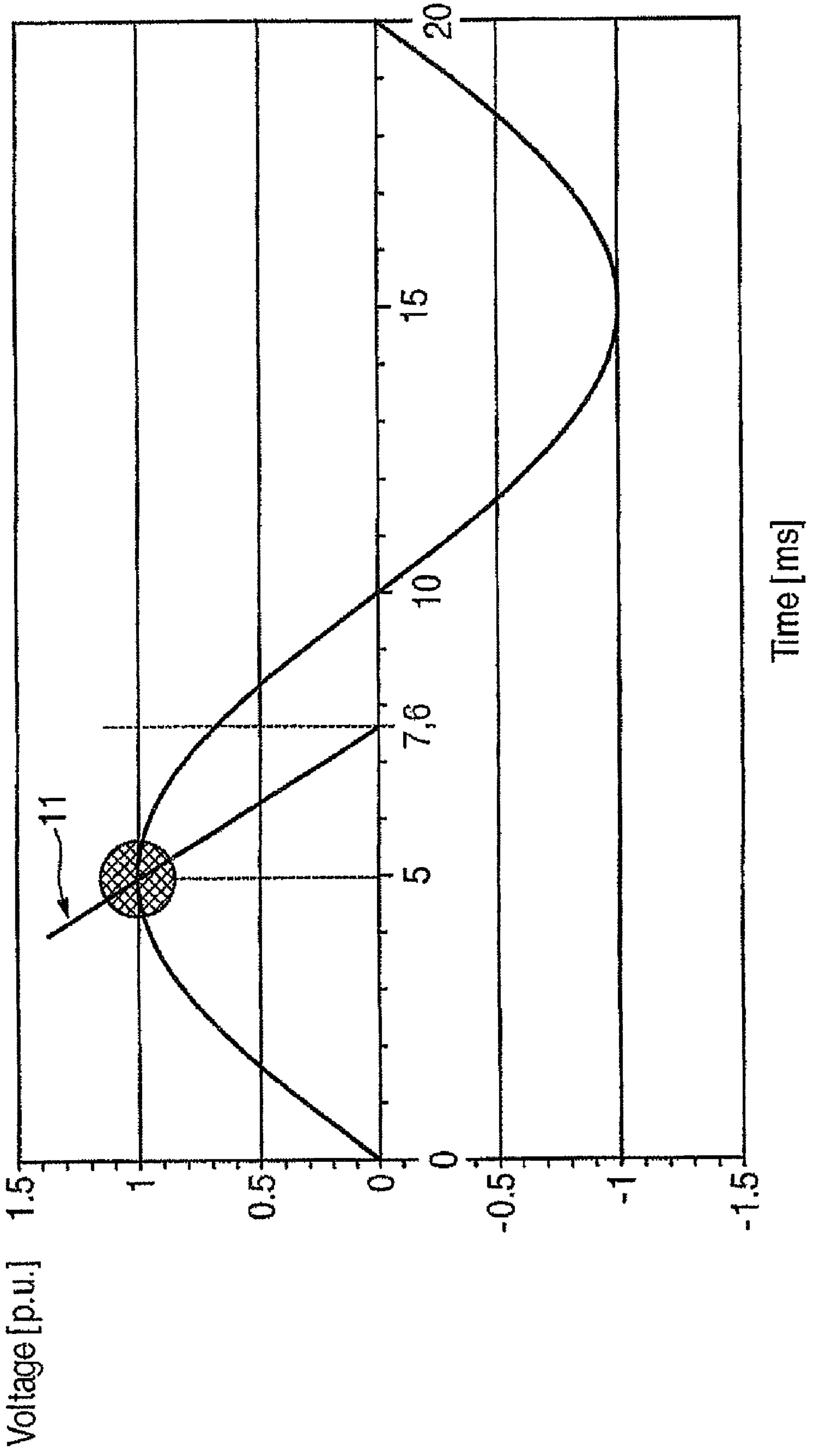
FIG. 8 shows the use of a pre-arcing characteristic for an inductive load on an interrupter gap in an electrical switching device.

FIGS. 7 and 8 each show a pre-arcing characteristic 11 for the interrupter gap 1. In this case, the pre-arcing characteristic 11 is illustrated in a simplified form as a linear profile with a specific gradient. The intention in FIG. 7 is to switch a capacitive load, for example an unloaded cable. As illustrated in FIG. 1, a capacitive load is preferably intended to be switched within a voltage zero crossing. In FIG. 7, the voltage has a sinusoidal profile. In this case, the pre-arcing characteristic 11 is sufficiently steep that an intersection of the voltage profile and of the pre-arcing characteristic 11 ideally coincides at a voltage zero crossing. In the case of a correspondingly flattened pre-arcing characteristic 11*a*, the pre-arcing characteristic 11*a* and the voltage profile intercept approximately at the time 5 ms, that is to say pre-arcing would occur even at this time, as a consequence of which, however, the ideal time for initiating an electric current occurs in advance of the voltage zero crossing. In consequence, for an ideal connection process for a capacitive load, an electrical switching device should be used which has a comparatively steep pre-arcing characteristic. In the exemplary embodiment with the pre-arcing characteristic 11 as shown in FIG. 7, the conductive contact between the contact pieces and the pre-arcing coincide at the time 10 ms, and allow the electrical switching device to be switched with virtually no overvoltage.

In the example illustrated in FIG. 8, the aim is to switch an inductive load. The pre-arcing characteristic 11 is, however, sufficiently steep that the pre-arcing characteristic and the voltage profile necessarily intercept. An arc is struck, with pre-arcing, between the moving contact pieces of the interrupter gap 1 at the time 5 ms. The contact pieces which can move relative to one another touch at the time 7.6 ms.

The occurrence of switching overvoltages during a switching process can therefore be effectively prevented by coupling the method according to the invention and by consideration of the flashover characteristic of the electrical switching device being used.

Figure 9:
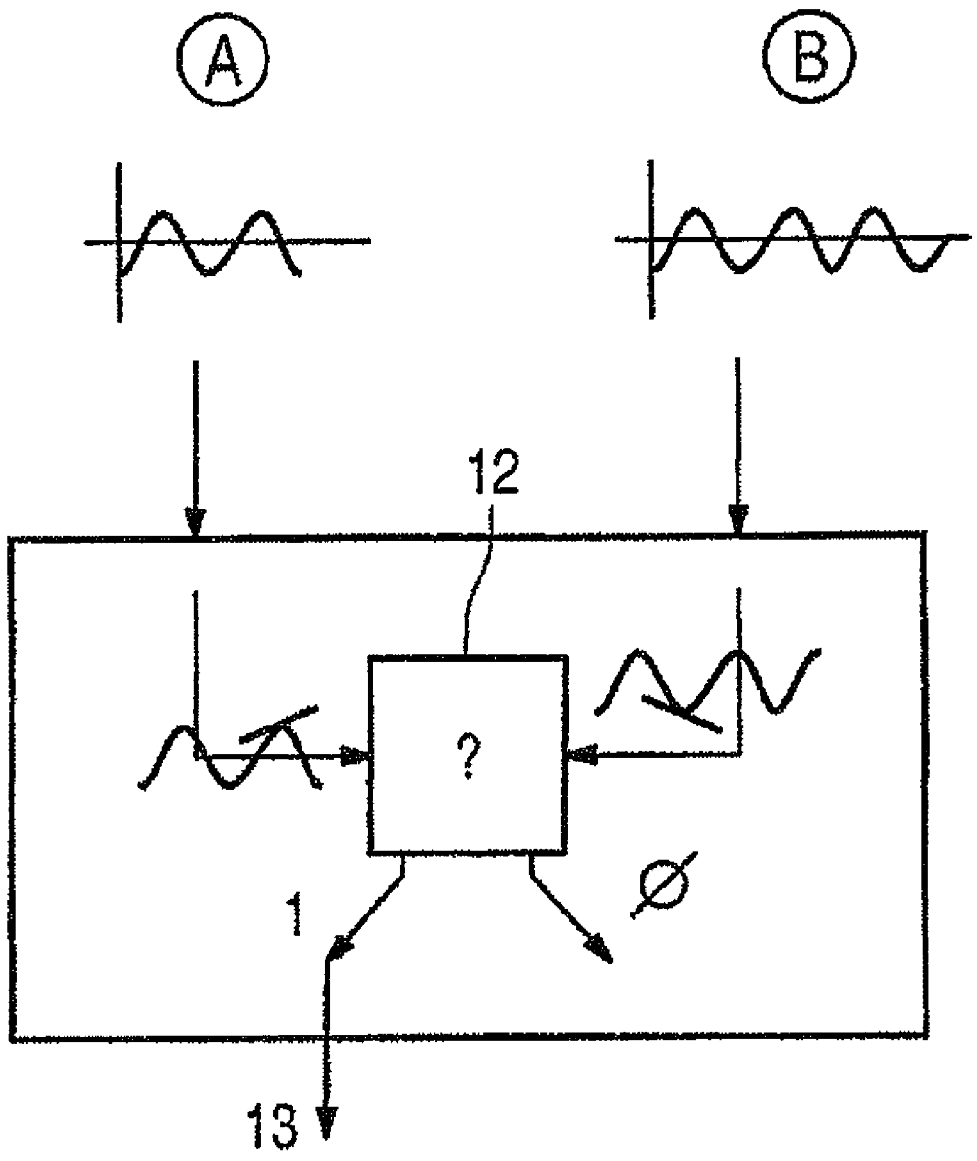
FIG. 9 shows a device for comparing voltage profiles.

FIG. 9 shows a fundamental design of an apparatus for carrying out the method.

The apparatus has a device 12 for comparing the rises in the driving voltage A and in the oscillation voltage B. A signal 13 is emitted when defined relationships between the rises occur.

The invention claimed is:

1. A method for determining a switching time for an electrical switching device having an interrupter gap formed between a first line section, carrying a driving voltage, and a second line section, forming a resonant circuit after a disconnection process of the switching device, the method which comprises:

determining a time profile of the driving voltage after the disconnection process of the electrical switching device;

determining a time profile of an oscillation voltage occurring in the resonant circuit after the disconnection process of the electrical switching device;

determining a time profile of a resultant voltage, which corresponds to a difference between the driving voltage and the oscillation voltage; and evaluating at least one rise in the driving voltage and at least one rise in the oscillation voltage, and defining a switching time in dependence on the rises and a time profile of a resultant voltage.

2. The method according to claim 1, which comprises setting the switching time in a vicinity of a zero crossing of the resultant voltage.

3. The method according to claim 1, which comprises choosing a vicinity of a zero crossing of the resultant voltage for the switching time at which the driving voltage and the oscillation voltage have rises in a common direction.

4. The method according to claim 2, which comprises choosing the vicinity of the zero crossing of the resultant voltage for the switching time at which the driving voltage has a negative rise and the oscillation current has a positive polarity, or at which the driving voltage has a positive rise and the oscillation current has a negative polarity.

5. The method according to claim 4, which comprises conducting the oscillation current to flow through a compensation inductor.

6. The method according to claim 1, wherein the step of determining the time profile of the oscillation voltage and/or the step of determining the oscillation current comprises determining by way of Prony's method.

7. The method according to claim 1, wherein the voltage across the interrupter gap after a disconnection process corresponds to the resultant voltage.

8. The method according to claim 1, which comprises taking the pre-arcing characteristic of the switching device into account when determining the switching time.

9. The method according to claim 1, wherein, in the event of progressive damping of the oscillation voltage and/or of the oscillation current, fixing the switching time in a vicinity of any desired zero crossing of the resultant voltage.

10. The method according to claim 1, which further comprises using the switching time for a connection process for the electrical switching device.

11. An apparatus for carrying out the method according to claim 1, comprising a device for comparing the rise in the driving voltage and the oscillation voltage, and/or the polarity of the oscillation current.

12. A method for determining a switching time for an electrical switching device having an interrupter gap formed between a first line section, carrying a driving voltage, and a second line section, forming a resonant circuit after a disconnection process of the switching device, the method which comprises:

determining a time profile of the driving voltage after the disconnection process of the electrical switching device;

determining a time profile of an oscillation voltage occurring in the resonant circuit after the disconnection process of the electrical switching device;

determining a time profile of an oscillation current flowing in the resonant circuit after the disconnection process of the electrical switching device;

determining a time profile of a resultant voltage, which corresponds to a difference between the driving voltage and the oscillation voltage; and evaluating at least one rise in the driving voltage and at least one polarity of the oscillation current, and defining a switching time in dependence on the at least one rise in the driving voltage and the at least one polarity of the oscillation current, and the time profile of the resultant voltage.

13. The method according to claim 12, which comprises setting the switching time in a vicinity of a zero crossing of the resultant voltage.

14. The method according to claim 12, which comprises choosing a vicinity of a zero crossing of the resultant voltage for the switching time at which the driving voltage and the oscillation voltage have rises in a common direction.

15. The method according to claim 12, which comprises choosing the vicinity of the zero crossing of the resultant voltage for the switching time at which the driving voltage has a negative rise and the oscillation current has a positive polarity, or at which the driving voltage has a positive rise and the oscillation current has a negative polarity.

16. The method according to claim 15, which comprises conducting the oscillation current to flow through a compensation inductor.

17. The method according to claim 12, wherein the step of determining the time profile of the oscillation voltage and/or the step of determining the oscillation current comprises determining by way of Prony's method.

18. The method according to claim 12, wherein the voltage across the interrupter gap after a disconnection process corresponds to the resultant voltage.

19. The method according to claim 12, which comprises taking the pre-arcing characteristic of the switching device into account when determining the switching time.

20. The method according to claim 12, wherein, in the event of progressive damping of the oscillation voltage and/or of the oscillation current, fixing the switching time in a vicinity of any desired zero crossing of the resultant voltage.

21. The method according to claim 12, which further comprises using the switching time for a connection process for the electrical switching device.

22. An apparatus for carrying out the method according to claim 12, comprising a device for comparing the rise in the driving voltage and the oscillation voltage, and/or the polarity of the oscillation current.

* * * * *